US008241912B2

(12) United States Patent
Loose

(10) Patent No.: US 8,241,912 B2
(45) Date of Patent: Aug. 14, 2012

(54) GAMING MACHINE HAVING MULTI-TOUCH SENSING DEVICE

(75) Inventor: Timothy C. Loose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 564 days.

(21) Appl. No.: 12/435,458

(22) Filed: May 5, 2009

(65) Prior Publication Data

US 2009/0325691 A1 Dec. 31, 2009

Related U.S. Application Data

(60) Provisional application No. 61/133,151, filed on Jun. 26, 2008.

(51) Int. Cl.

| | |
|---|---|
| ***A63F 13/00*** | (2006.01) |
| ***G09G 5/00*** | (2006.01) |
| ***G09F 3/041*** | (2006.01) |
| ***G09F 3/00*** | (2006.01) |

(52) U.S. Cl. .............. 436/37; 463/30; 463/16; 345/156; 345/173; 715/856

(58) Field of Classification Search .................... 463/16, 463/30, 37; 345/156, 173; 715/856
See application file for complete search history.

(56) References Cited

U.S. PATENT DOCUMENTS 4,484,179 A 11/1984 Kasday
4,746,770 A 5/1988 McAvinney
4,968,877 A 11/1990 McAvinney et al.
5,511,148 A 4/1996 Wellner
5,589,856 A 12/1996 Stein et al.
5,808,567 A 9/1998 McCloud
5,896,126 A 4/1999 Shieh
5,943,043 A 8/1999 Furuhata et al.
6,067,112 A 5/2000 Wellner et al.
(Continued)

FOREIGN PATENT DOCUMENTS

EP 309946 4/1989
(Continued)

OTHER PUBLICATIONS

Hand Tracking, Finger Identification, and Chordic Manipulation on a Multi-Touch Surface, by Wayne Westerman; 363 pages (Spring 1999).

(Continued)

*Primary Examiner* — Peter DungBa Vo
*Assistant Examiner* — Jeffrey Wong
(74) *Attorney, Agent, or Firm* — Nixon Peabody LLP

(57) ABSTRACT

A gaming system and method for conducting a wagering game includes a primary display that displays a randomly selected outcome. The gaming system includes a multi-touch input system having a multi-touch sensing device, a memory, and a local controller. The multi-touch sensing device includes an array of input sensors that detect a multi-point gesture. Each sensor detects a touch input made by a player of the wagering game. The memory includes gesture classification codes each representing a distinct combination of characteristics relating to the gesture. The local controller receives data indicative of at least two of the characteristics related to the multi-point gesture and determines whether the data corresponds to any of the gesture classification codes. A main controller is coupled to the local controller to receive the gesture classification code responsive to the local controller determining that the data corresponds to a gesture classification code.

19 Claims, 6 Drawing Sheets

U.S. PATENT DOCUMENTS

| | | | |
|---|---|---|---|
| 6,246,395 B1 | 6/2001 | Goyins et al. | |
| 6,255,604 B1 | 7/2001 | Tokioka et al. | |
| 6,677,932 B1 | 1/2004 | Westerman | |
| 6,788,295 B1 | 9/2004 | Inkster | |
| 6,819,312 B2 | 11/2004 | Fish | |
| 6,856,259 B1 | 2/2005 | Sharp | |
| 6,932,706 B1 * | 8/2005 | Kaminkow | 463/36 |
| 7,077,009 B2 | 7/2006 | Lokhorst et al. | |
| 7,204,428 B2 | 4/2007 | Wilson | |
| 7,254,775 B2 | 8/2007 | Geaghan et al. | |
| 7,294,059 B2 | 11/2007 | Silva et al. | |
| RE40,153 E | 3/2008 | Westerman et al. | |
| 7,379,562 B2 | 5/2008 | Wilson | |
| 7,397,464 B1 | 7/2008 | Robbins et al. | |
| 7,411,575 B2 | 8/2008 | Hill et al. | |
| 7,479,949 B2 | 1/2009 | Jobs et al. | |
| 2002/0097223 A1 * | 7/2002 | Rosenberg | 345/157 |
| 2002/0173354 A1 | 11/2002 | Winans et al. | |
| 2003/0067447 A1 | 4/2003 | Geaghan et al. | |
| 2004/0001048 A1 | 1/2004 | Kraus et al. | |
| 2004/0038721 A1 | 2/2004 | Wells | |
| 2004/0166937 A1 | 8/2004 | Rothschild et al. | |
| 2005/0059458 A1 | 3/2005 | Griswold et al. | |
| 2005/0113163 A1 * | 5/2005 | Mattice et al. | 463/16 |
| 2005/0227217 A1 | 10/2005 | Wilson | |
| 2005/0259378 A1 | 11/2005 | Hill et al. | |
| 2006/0001652 A1 | 1/2006 | Chiu et al. | |
| 2006/0010400 A1 * | 1/2006 | Dehlin et al. | 715/856 |
| 2006/0031786 A1 | 2/2006 | Hillis et al. | |
| 2006/0073891 A1 | 4/2006 | Holt | |
| 2006/0101354 A1 | 5/2006 | Hashimoto et al. | |
| 2006/0164399 A1 | 7/2006 | Cheston et al. | |
| 2006/0284874 A1 | 12/2006 | Wilson | |
| 2006/0294247 A1 | 12/2006 | Hinckley et al. | |
| 2007/0093290 A1 | 4/2007 | Winans et al. | |
| 2007/0124370 A1 | 5/2007 | Nareddy et al. | |
| 2007/0152984 A1 | 7/2007 | Ording et al. | |
| 2007/0177803 A1 | 8/2007 | Elias et al. | |
| 2007/0201863 A1 | 8/2007 | Wilson et al. | |
| 2007/0247435 A1 | 10/2007 | Benko et al. | |
| 2007/0270203 A1 | 11/2007 | Aida | |
| 2008/0158145 A1 | 7/2008 | Westerman | |
| 2008/0158146 A1 | 7/2008 | Westerman | |
| 2008/0158147 A1 | 7/2008 | Westerman et al. | |
| 2008/0158168 A1 | 7/2008 | Westerman et al. | |
| 2008/0158169 A1 | 7/2008 | O'Connor et al. | |
| 2008/0158174 A1 | 7/2008 | Land et al. | |
| 2008/0163130 A1 | 7/2008 | Westerman | |
| 2008/0180654 A1 | 7/2008 | Bathiche et al. | |
| 2008/0211766 A1 * | 9/2008 | Westerman et al. | 345/156 |
| 2008/0231611 A1 | 9/2008 | Bathiche et al. | |
| 2008/0309631 A1 | 12/2008 | Westerman et al. | |
| 2008/0309634 A1 | 12/2008 | Hotelling et al. | |
| 2009/0002327 A1 | 1/2009 | Wilson et al. | |
| 2009/0002344 A1 | 1/2009 | Wilson et al. | |
| 2009/0021489 A1 | 1/2009 | Westerman et al. | |

FOREIGN PATENT DOCUMENTS

| | | |
|---|---|---|
| JP | 1269120 A | 10/1989 |
| JP | 8083144 A | 3/1996 |
| JP | 8190453 A | 7/1996 |
| JP | 8241161 A | 9/1996 |
| JP | 2000/010733 A | 1/2000 |
| WO | WO/97/30416 | 8/1997 |
| WO | WO/99/19855 | 4/1999 |
| WO | WO/2006/020305 | 2/2006 |
| WO | WO/2008/095132 | 10/2008 |
| WO | WO/2008/017077 | 12/2008 |

OTHER PUBLICATIONS

A Multi-Touch Three Dimensional Touch-Sensitive Tablet; CHI'85 Proceedings; pp. 21-25 (Apr. 1985).

The Sensor Frame Graphic Manipulator Final Report (Sensor Frame) 27 pages; (printed on Feb. 6, 2009).

The Design of a GUI Paradigm based on Tablets, Two-Hands, and Transparency; Gordon Kurtenbach, George Fitmaurice, Thomas Baudel, and Bill Buxton; 8 pages; (printed on Feb. 6, 2009).

SmartSkin: An Infrastructure for Freehand Manipulation on Interactive Surfaces, by Jun Rekimoto, Interaction Laboratory; 8 pages; (printed on Feb. 6, 2009).

Single-Handed Interction Techniques for Multiple Pressure-Sensitive Strips by Gábor Blaskó, Steven Feiner; 4 pages; (printed on Feb. 6, 2009).

A Multi-finger Interface for Performance Animation of Deformable Drawings; Tomer Moscovich, Takeo Igarashi, Jun Rekimoto, Kentaro Fukuchi, John F. Hughes; 2 pages; (printed on Feb. 6, 2009).

Precise Selection Techniques for Multi-Touch Screens; Hrvoje Benko and Andrew D. Wilson and Patrick Baudisch; 10 pages; (printed on Feb. 6, 2009).

ThinSight: Versatile Multi-touch Sensing for Thin Form-factor Displays; Steve Hodges, Shahram Izadi, Alex Butler, Alban Rrustemi and Bill Buxton; 10 pages; (printed on Feb. 6, 2009).

An Overview of Optical-Touch Technologies; Ian Maxwell; 5 pages; (dated Dec. 2007).

Freescale Semiconductor, E-field Keyboard Designs, Michael Steffen; 6 pages; (dated Sep. 2007).

Texas Instruments, PCB-Based Capacitive Touch Sensing with MSP430; Zack Albus; 25 pages; (dated Jun. 2007— Revised Oct. 2007).

Planet Analog, The art of capacitive touch sensing; Mark Lee, Cypress Semiconductor Corp.; 5 pages; (dated Mar. 1, 2006).

* cited by examiner

GAMING MACHINE HAVING MULTI-TOUCH SENSING DEVICE

CROSS-REFERENCE TO RELATED APPLICATION

This application claims the benefit of U.S. Provisional Application Ser. No. 61/133,151, filed Jun. 26, 2008, entitled "Gaming Machine Having Multi-Touch Sensing Device."

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for conducting wagering games, and more particularly, to gaming systems and methods for conducing wagering games that include a multi-touch sensing device for interpreting gestures made in relation to a wagering game.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Gaming machines have also utilized a variety of input devices for receiving input from a player, such as buttons and touch screen devices. However, these input devices are limited in that they can receive only one input at a time from the player. For example, if a player touches a singlepoint sensing device such as a singlepoint touch screen device at two distinct points simultaneously, only one coordinate is provided by the touch screen driver corresponding to one of the distinct points only or to a single average point between the two points. The inability of the player to interact with the gaming machine and other players by providing multiple inputs simultaneously is a significant disadvantage to gaming machines heretofore.

Furthermore, input devices that are associated with a display, i.e., where the display is located beneath or behind the input device, have certain limitations relating to the shape and the size of the input device that can be added to gaming machine. Alternatives to such input devices that are simpler and less expensive, and which are not associated with a display for displaying the outcome of a wagering game, would be particularly attractive to gaming machines manufacturers and operators.

SUMMARY OF THE INVENTION

According to an aspect of the present disclosure, a gaming system includes a primary display, a multi-touch input system, and a main controller. The primary display displays a randomly selected outcome of a wagering game. The multi-touch input system includes a multi-touch sensing device, a memory, and a local controller coupled to the multi-touch sensing device and to the memory. The multi-touch sensing device includes an array of input sensors that detect a multi-point gesture. Each of the sensors detects a touch input made by a player of the wagering game. The memory includes a plurality of gesture classification codes each representing a distinct combination of characteristics relating to the gesture. The local controller is programmed to receive data indicative of at least two of the characteristics related to the multi-point gesture and to determine whether the data corresponds to any one of the gesture classification codes. The main controller is coupled to the local controller and receives the one gesture classification code responsive to the local controller determining that the data corresponds to the one gesture classification code. The main controller also receives an indication of a wager to play the wagering game.

The above-described aspect can include any combination of the following additional optional aspects. The main controller receives any one of the gesture classification codes only when the local controller determines that the data associated with the multi-touch gesture corresponds to any one of the gesture classification codes. The at least two characteristics include any combination comprising at least two of a location of a contact point relative to the multi-point sensing device, a gesture direction, or a gesture speed. Or, the at least two of the characteristics are the gesture direction and the gesture speed. The main controller can be programmed to cause a graphic relating to the wagering game to be displayed on the primary display such that the graphic appears to move in a manner corresponding to the at least two characteristics. The graphic can be involved in the depiction of the randomly selected outcome of the wagering game. The multi-point gesture approximates a dice throw gesture such that a speed of the multi-point gesture is related to a speed of dice being thrown and a direction of the multi-point gesture is related to a spin direction of the dice. The array of input sensors can include an array of conductive pads arranged on a printed circuit board. Each of the conductive pads detects the at least one input via capacitive sensing of one or more of the player's fingers. The multi-touch input system further includes a substrate overlaying the array of input sensors, and touch inputs are made relative to the substrate. The array of input sensors forms a grid of touchpad cells. Each of the touchpad cells can detect a contact point. The gaming system further includes a cabinet that houses a gaming terminal, and the multi-touch sensing device can optionally located on a button panel of the gaming terminal relative to the cabinet and is positioned in a non-overlapping relationship with the primary display.

According to another aspect of this disclosure, a method of conducting a wagering game on a gaming machine includes receiving, via a main controller, an indication of a wager to play the wagering game; displaying a randomly selected outcome of the wagering game on a display of the gaming machine; sensing a multi-point gesture from a player via a multi-touch sensing device, the multi-touch sensing device comprising an array of input sensors, each sensor detecting at least one touch input made by the player; producing, from an output of the multi-touch sensing device, data indicative of at least two characteristics related to the multi-point gesture via a local controller coupled to the multi-touch sensing device; determining whether the data corresponds to one of a plurality of gesture classification codes, each a distinct combination of characteristics relating to the multi-point gesture; and responsive to the data corresponding to the one gesture classification code, communicating the one gesture classification code to the main controller.

The above-described method can include any combination of the following additional optional aspects. The method can further include displaying an animation of a graphic related to an outcome of the wagering game, wherein the graphic appears to move in accordance with the sensed gesture characteristics indicated by the code. The characteristics of the multi-point gesture can include a location, a direction and a speed of the at least two distinct contact points. The multi-point gesture can approximate a dice throw gesture. The animated graphic that is displayed can depict at least two dice being thrown such that the speed of the multi-point gesture is related to a speed of the dice being thrown and the direction of the multi-point gesture is related to a spin direction of the dice. The communicating can be carried out only when the local controller determines that the data corresponds to any of the plurality of gesture classification codes. The multi-touch sensing device can be located on a button panel of the gaming machine and is positioned in a non-overlapping relationship with the display. A computer-readable storage medium can be encoded with instructions for directing a gaming system to perform the methods disclosed herein.

According to still another aspect of this disclosure, a method of detecting gestures sensed by a multi-touch sensing device in a gaming machine includes: receiving, from an array of input sensors of the multi-point sensing device, data indicative of at least two characteristics related to a multi-point gesture sensed by the array of input sensors, the multi-point gesture being made by a player of a wagering game on the gaming machine relative to the array of input sensors; determining, via a local controller coupled to the multi-point sensing device, whether the data corresponds to any one of a plurality of gesture classification codes, each code representing a distinct combination of characteristics relating to the multi-point gesture; and responsive to the data corresponding to one of the gesture classification codes, communicating the one gesture classification code to a main controller, which causes a graphic to be displayed via the main controller, the graphic appearing to move in accordance with the at least two characteristics indicated by the code, the graphic being related to the wagering game.

The above-described method can include any combination of the following additional optional aspects. The at least two characteristics can include any combination comprising at least two of a location of a contact point relative to the multi-point sensing device, a gesture direction, or a gesture speed. The at least two characteristics can include the gesture direction and the gesture speed, wherein the graphic includes simulated dice. The multipoint gesture can approximate a dice throw gesture such that the gesture speed of the multi-point gesture is related to a speed of the simulated dice and the gesture direction of the multi-point gesture is related to a spin direction of the simulated dice. The simulated dice can be involved in the depiction of a randomly selected outcome of the wagering game.

According to still another aspect of the invention, a computer readable storage medium is encoded with instructions for directing a gaming system to perform any of the above methods or methods disclosed herein.

Additional aspects of the present disclosure will be apparent to those of ordinary skill in the art in view of the detailed description of various implementations, which is made with reference to the drawings, a brief description of which is provided below.

DETAILED DESCRIPTION

Figure 1A:
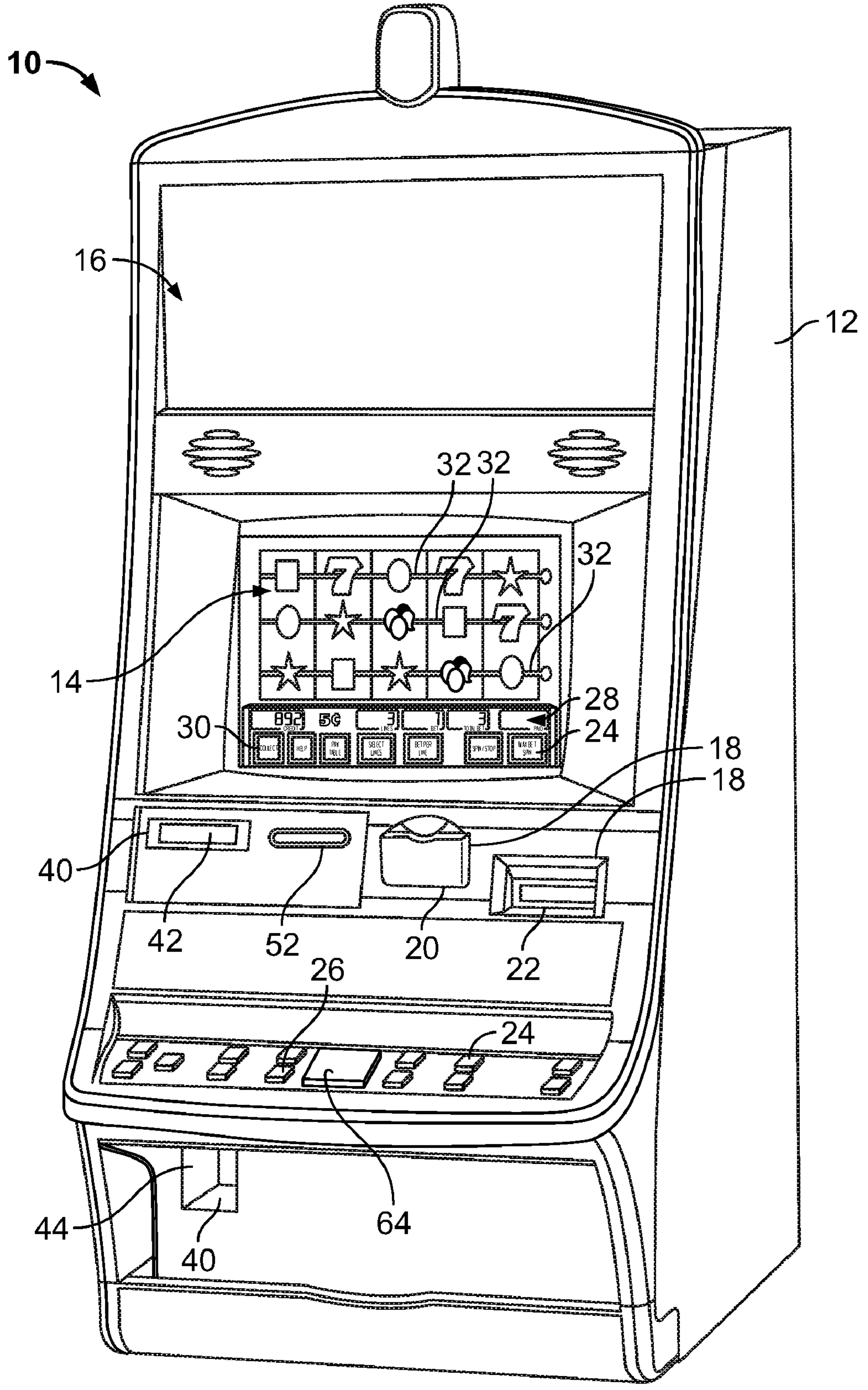
FIG. 1*a* is a perspective view of a free standing gaming machine embodying the present invention, which includes a multi-touch input system.

While this invention is susceptible of implementations in many different forms, there is shown in the drawings and will herein be described in detail preferred embodiments and implementations of the invention with the understanding that the present disclosure is to be considered as an exemplification of the principles of the invention and is not intended to limit the broad aspect of the invention to the embodiments/implementations illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
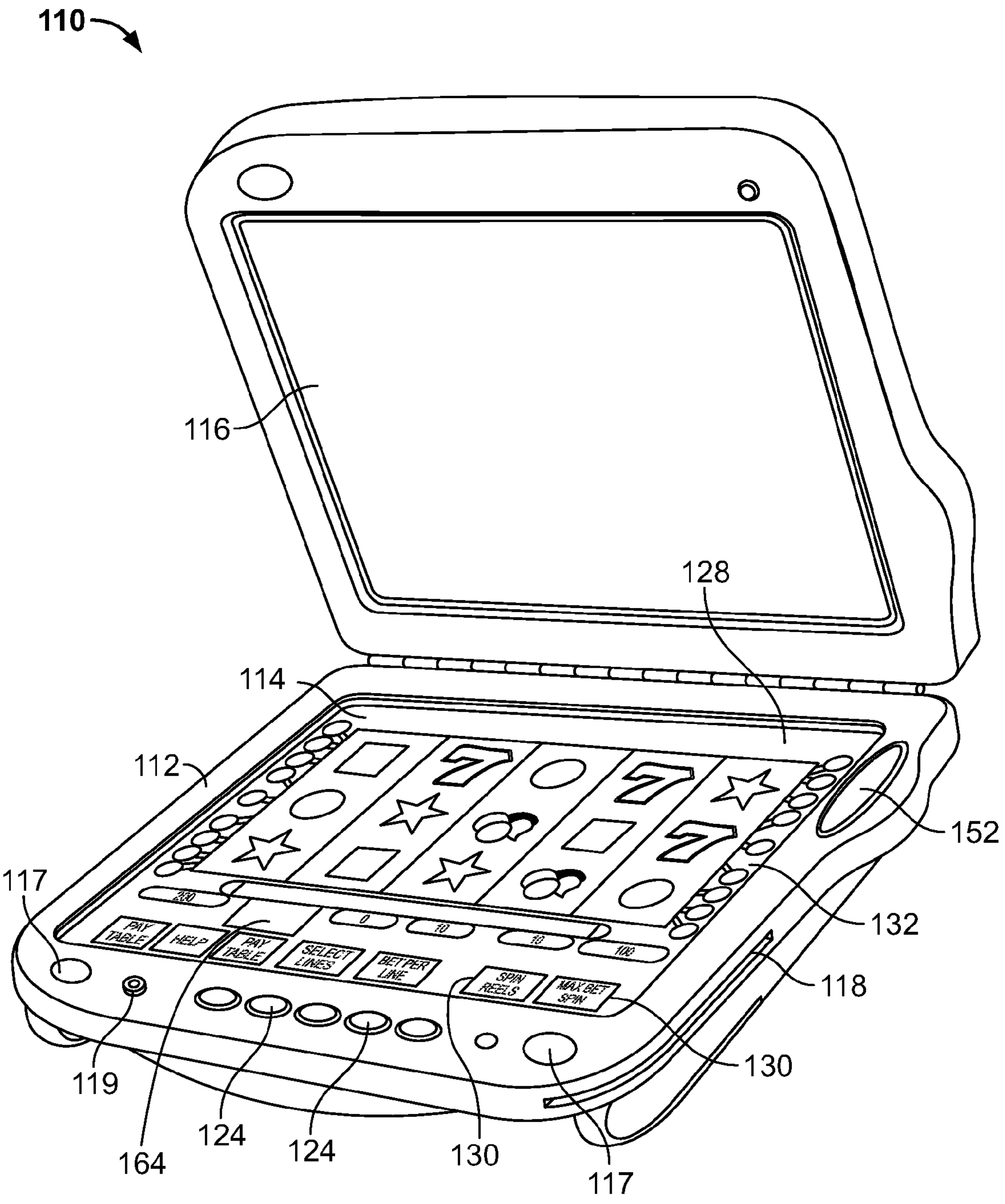
FIG. 1*b* is a perspective view of a handheld gaming machine embodying the present invention, which includes a multi-touch input system.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
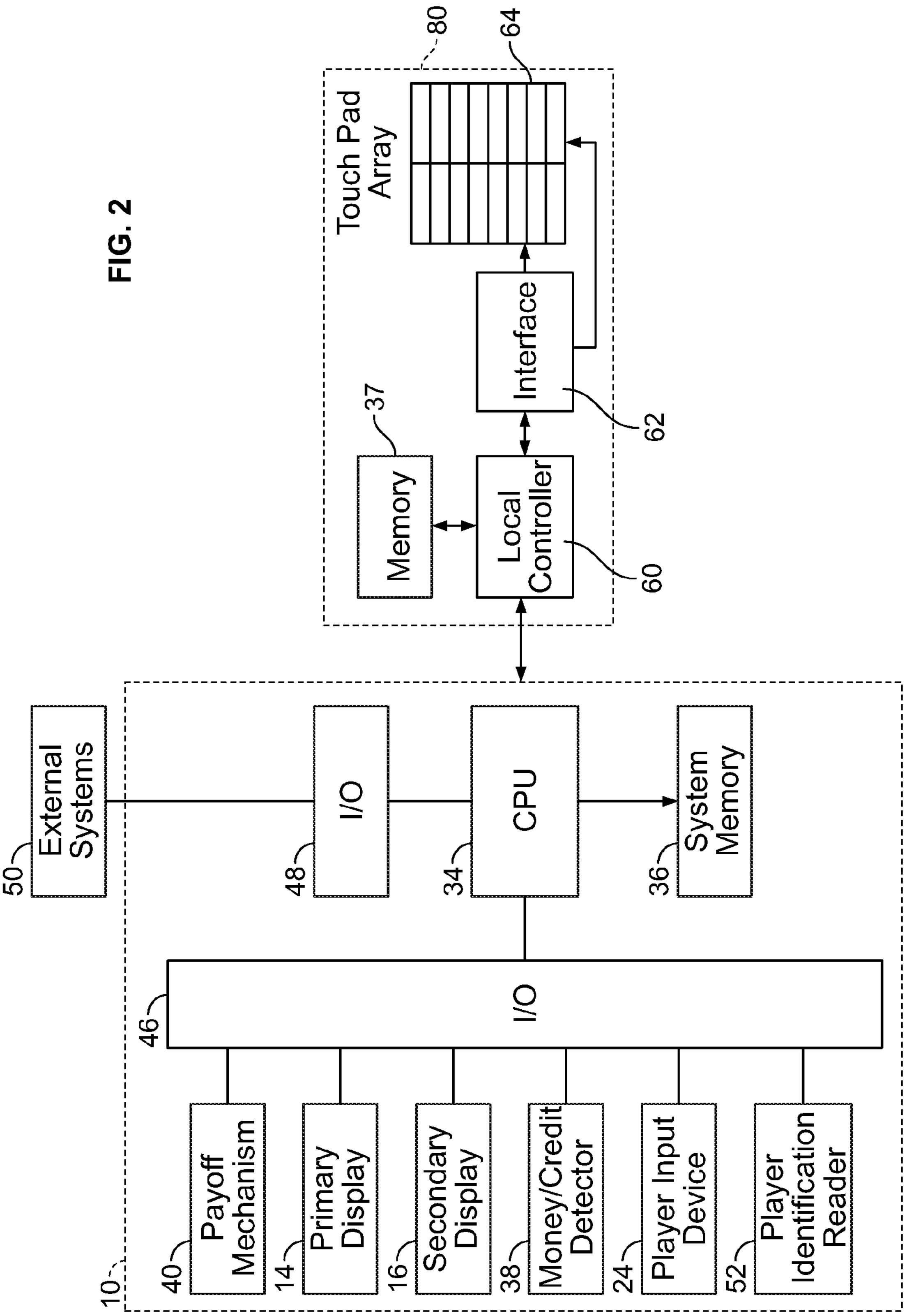
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

As shown in FIGS. 1*a* and 1*b*, the gaming machines 10, 110 include a multi-touch sensing device 64. In FIG. 1*a*, the multi-touch sensing device 64 is shown in a button panel area of the gaming machine 10 relative to the housing or cabinet 12. In FIG. 1*b*, the multi-touch sensing device 64 is shown integrated with the primary display 114 such that the multi-touch sensing device 64 can detect touches or touch inputs relative to the primary display 114. As used herein, a "touch" or "touch input" does not necessarily mean that the player's finger or body part actually must physically contact or touch the multi-touch sensing device 64. As is known via techniques such as via capacitive sensing techniques and other electromagnetic techniques, the player's body need not actually touch the multi-touch sensing device 64, but rather need only be placed in sufficient proximity to the multi-touch sensing device 64 so as to be interpreted as a touch input.

FIG. 2 illustrates a multi-touch input system 80 that includes the multi-touch sensing device 64, which is coupled via an interface 62 to a local controller 60, which is coupled to a memory 37. The local controller 60 is coupled to the controller 34 or main controller, either directly or via the I/O circuit 48. The local controller 60 receives information outputted from the multi-touch sensing device 64 via the interface 62, where the information is indicative of a multi-point gesture made relative to the multi-touch sensing device 64. In a specific aspect, the multi-touch sensing device 64 includes an array of input sensors 66 (shown in FIG. 3) for detecting contact points representative of one or more possible multi-point gestures made relative to the array of input sensors 66, which is described in more detail below, and a printed circuit board that supports the array of input sensors 66. Each input sensor 66*a,b,c,d,e,f,g,h,i,j,k,l,m,n,o,p* in the array detects one touch input at a time made by the player of the wagering game. As an array 66, however, multiple touches on different input sensors are detected simultaneously by the local controller 60, as will be explained more fully below.

The gaming machines 10,110 may communicate with other external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Security features are advantageously utilized where the gaming machines 10,110 communicate wirelessly with external systems 50, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, Establishing Wireless Robust Security Networks: A Guide to IEEE 802.11, and SP 800-48, Wireless Network Security: 802.11, Bluetooth and Handheld Devices, both of which are incorporated herein by reference in their entirety.

As used herein, a multi-point gesture refers to a gesture that originates by touching two or more points relative to the multi-touch sensing device 64. By "relative to" it is meant that the body need not actually physically touch any part of the multi-touch sensing device 64, but must be brought sufficiently near the device 64 so that a touch input can be detected. Such multi-point gestures can be bimanual (i.e., require use of both hands to create a "chording" effect) or multi-digit (i.e., require use of two or more fingers as in rotation of a dial). Bimanual gestures may be made by the hands of a single player, or by different hands of different players, such as in a multi-player wagering game. By "simultaneously" it is meant that at some point in time, more than one point is touched. In other words, it is not necessary to touch two different points at the precise same moment in time. Rather, one point can be touched first, followed by a second point, so long as the first point remains touched as the second point is touched. In that sense, the first and second points are touched simultaneously. If contact must be removed from the first point before the second touch is applied, then such a touch-scheme would be deemed to be a single-touch scheme. For example, each individual input sensor 66*a,b,c,d,e,f,g,h,i,j,k,l,m,n,o,p* in the array of input sensors 66 can, for example, detect only one touch input at a time, but the entire array 66 can detect multiple touches simultaneously.

Figure 3:
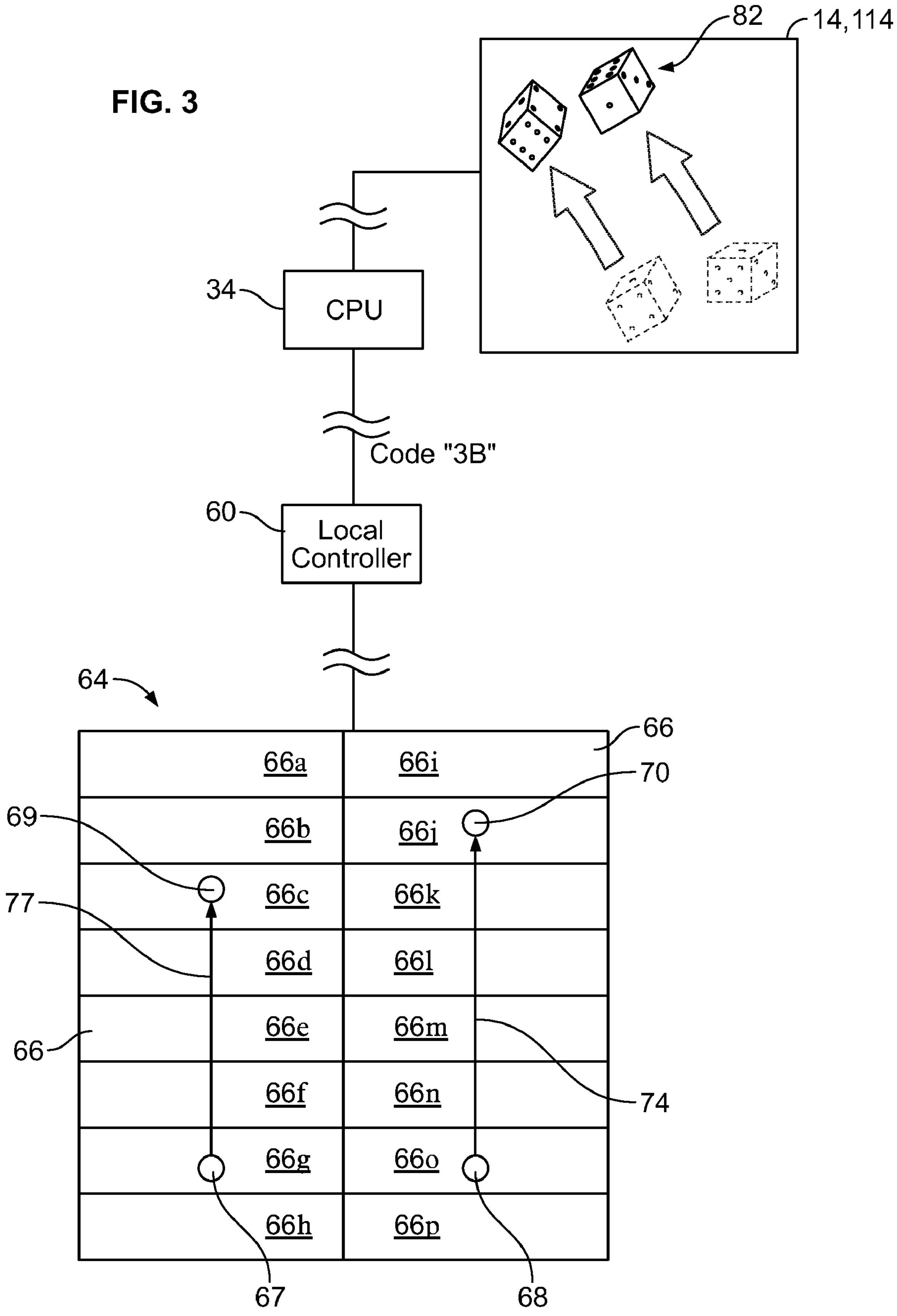
FIG. 3 is a functional diagram of an implementation that includes an array of input sensors in a multi-touch sensing device and a display of the gaming machine displaying a graphic corresponding to a multi-touch gesture identified by the multi-touch input system.

Turning now to FIG. 3, the multi-touch sensing device 64 is described here in more detail. The multi-touch sensing device 64 includes the array of input sensors 66. Each of the input sensors 66*a,b,c,d,e,f,g,h,i,j,k,l,m,n,o,p* are capable of detecting at least one touch input made relative to the sensor 66*a,b,c,d,e,f,g,h,i,j,k,l,m,n,o,p*. In an embodiment, the array of input sensors 66 includes a plurality of conductive pads mounted on a printed circuit board (PCB), which supports the necessary electrical connections to connect the outputs of each input sensor 66 to the interface 62 (shown in FIG. 2). Each of the conductive pads detect the touch input by capacitive sensing, though in other aspects, other suitable sensing techniques can be employed. Alternative sensing techniques are well known (e.g., photoelectric, infrared, optical, piezoelectric, frustrated total internal reflection, laser, electromagnetic, electrostatic, inductive, and the like), and will not be described in detail here. Some techniques require a physical contact with the array of input sensors 64 (either by the player's body or by a device held by the player), and others work by proximity detection, producing an output indicative of a touch input when an object or body part is brought in sufficient proximity to the sensor. As shown in FIG. 3, the input sensors 66 are arranged in a rectangular array. In the illustrated example, the array includes 16 input sensors 66 in an arrangement of two columns by eight rows. It is contemplated that the array of input sensors 66 can include other shapes or arrangements, and may include more or fewer numbers or rows and/or columns. For example, to detect circular gestures, it may be desired to arrange the array input sensors 66 in a circular pattern. As used herein, "array" refers to any arrangement of the input sensors. Here, it is convenient to refer to an array as a grid comprising rows and columns, but any other arrangement is also contemplated. The input sensors 66 in other aspects can be arranged as a grid of touchpad cells, each capable of detecting one contact point.

The size and resolution of the multi-touch sensing device 64 can be optimized for detecting multiple touch inputs, specifically associated with gestures made by a player in a wagering game. For example, the multi-touch sensing device 64 is about 2 inches wide by about 3 inches long, and may have a fairly low resolution (e.g., a total of 16 individual input sensors 66). In other embodiments, the multi-touch sensing device 64 is divided in half (left to right) and implemented as two single-touch devices. Other methods of sensing multiple contacts with a multi-touch sensing device are described in PCT Application No. PCT/US2007/021625, filed on Oct. 10, 2007, assigned to WMS Gaming Inc., entitled "Multi-Player, Multi-Touch Table for Use in Wagering Game Systems."

Preferably, the components of the multi-touch input system 80 are constructed so that they form a single unit. For example, the multi-touch sensing device 64, the local controller 60, the memory 37, and the interface 62 are mounted on a common substrate, such as a PCB to form a compact device that can be easily installed as a component of the gaming machine 10, 110. In the illustrated example of FIG. 3, the total number of electrodes (for example, 16) is significantly lower than for a typical LCD display, resulting in simpler electronics and lower cost. Direct wiring of each input sensor 66 to the interface 62 can be achieved instead of mounting sensor circuits to the array of input sensors 66. An advantage of this multi-touch input system 80 is that is simple, easy to fabricate, and can be constructed as a separate module for assembly into a gaming machine 10, 110. Another advantage is that certain "gross" (as opposed to fine) gestures do not necessarily require a high resolution touch sensor, and the multi-touch input system 80 herein provides a simple, fast human-machine interface for detecting gestures. Other advantages are discussed elsewhere herein.

FIG. 3 further illustrates the multi-touch sensing device 64 sensing player contacts representing the path of two fingertips associated with a multi-touch gesture made in relation to a wagering game. In this example, the multi-touch gesture approximates a dice throw gesture. In other words, the player makes a gesture relative to the multi-touch sensing device 64 that is similar to or approximates how the player would throw dice. The contact points designated as circles 67, 68 represent starting positions of each fingertip. The contact points designated as circles 69 and 70 represent ending positions of each fingertip. Paths 77 and 74 illustrate the movement of the fingertips between the starting positions 67, 68 and the ending positions 69, 70. The path 77 of a first fingertip (which starts at contact point 67 and ends at contact point 69) is shorter than the path 74 of a second fingertip (which starts at contact point 68 and ends at contact point 70). Because the path 74 of the right fingertip is longer than the path 77 of the left fingertip, the multi-point gesture represented by contact points 67, 68, 69, 70 is indicative of a dice roll with a spin direction to the left. The lengths and time periods associated with the paths 77, 74 determine the speed of the simulated dice throw. For example, the local controller 60 determines the time when the initial and final contact points 68, 70 were made and the "distance" of the gesture, spanning the input sensors 66*j*-66*o*.

The multi-touch sensing device 64 optionally includes a thin, plastic overlay or substrate for protection and appearance. The overlay may include information, such as instructions for using the multi-touch sensing device 64, or a graphic, such as two tumbling dice or other graphics related to a wagering game. The multi-touch sensing device 64 can be located on a panel of the gaming machine 10, 110 with other input devices 26, as shown in FIG. 1*a* (and designated as 164 in FIG. 1*b*), or may be located in a different location on the gaming machine 10. Preferably, the multi-touch sensing device 64 is located in the gaming machine 10, 110 relative to a housing 12, 112 or cabinet thereof and is positioned in a non-overlapping relationship with the primary display 14, 114 or the secondary display 16, 116.

As described above with respect to FIG. 2, the multi-touch sensing device 64 is one component of a multi-point input system 80. In an embodiment, the multi-touch sensing device 64 is connected to circuitry associated with an interface 62. The interface 62 receives the individual output data from the respective input sensors of the array of input sensors 66 and converts them into gesture data indicative of characteristics related to the multi-point gesture. Preferably, the gesture data is indicative of at least two characteristics related to the multi-point gesture. Such characteristics include a location of a contact point relative to the multi-point sensing device 64, a gesture direction, a gesture duration or length (as indicated by paths 77, 74), or a gesture speed. The local controller determines whether the gesture data received from the multi-point sensing device 64 corresponds to any of a plurality of gesture classification codes stored in the memory 37. If a valid gesture is determined (i.e., the gesture data corresponds to one of the plurality of gesture classification codes), the local controller 60 communicates the classification code to the controller 34. This communication may occur over a USB connection, for example, though any other suitable wired or wireless connection techniques are contemplated. Note that if no valid gesture is determined, the local controller 60 may communicate an error code to the controller 34, so that the game may instruct the player to try again, or some other appropriate response. Another option is for the local controller to simply ignore the attempted input, thereby relieving the controller 34 to perform other tasks relating to the wagering game. An advantage of having a separate local controller 60 filter only valid gestures is that the controller 34 is not burdened by having to check every gesture made relative to the multi-touch sensing device 64 to determine whether it recognizes the gesture. Such burdening of the controller 34 disadvantageously prevents it from processing other tasks and functions related to the wagering game. In this sense, the local controller 60 acts as a "filter," allowing only valid gestures to be passed to the controller 34, such that when the CPU receives a classification code from the local controller 60, the controller 34 can analyze that classification code to determine what function to perform.

Thus, rather than providing the raw data, e.g., the X and Y locations of each touch input, continuously to the main game controller 34, the local controller 60 takes the burden of interpreting the gesture data outputted by array of input sensors 66 via the interface 62 and classifies the gesture data according to a predetermined number of valid gestures.

The local controller 60 includes a predetermined classification system stored in the memory 37, where the predetermined classification system includes a plurality of gesture classification codes, each code representing a distinct combination of characteristics relating to the multi-point gesture. The predetermined classification system recognizes a finite number of valid gestures. In the dice throw gesture example, the relevant gesture characteristics include the gesture speed and the spin direction of the multi-point gesture. In a specific, non-limiting example, the following set of predetermined gesture classifications codes for a dice throw is represented as follows in the memory 37:

| | SPIN | | | | |
|---|---|---|---|---|---|
| SPEED | Hard Left | Left | Straight | Right | Hard Right |
| Very Slow | 1A | 1B | 1C | 1D | 1E |
| Slow | 2A | 2B | 2C | 2D | 2E |
| Medium | 3A | 3B | 3C | 3D | 3E |
| Fast | 4A | 4B | 4C | 4D | 4E |
| Very Fast | 5A | 5B | 5C | 5D | 5E |

The above table stores two characteristics relating to a multi-point gesture (speed and spin direction) along with corresponding gesture classification codes (1A, 1B, etc.), which are mutually distinct. In this example, the local controller 60 receives the gesture data indicative of at least two characteristics (in this example, speed and spin direction) of relating to the multi-point gesture, and determines whether the data corresponds to any of the gesture classification codes in the exemplary table above based on the speed (e.g., slow, fast) and direction (e.g., left, right) characteristics relating to the multi-point gesture. If the local controller 60 determines that the gesture data corresponds to one of the predetermined classification codes, it communicates the corresponding gesture classification code, e.g., 1A, 2B, 3C, etc., to the controller 34. If the local controller 60 determines that the gesture data does not correspond to any of the predetermined classification codes, it does not communicate any classification code to the controller 34. Note that the particular code designations are purely exemplary, and those skilled in the art will appreciate that any suitable code may be used, as long as each code representing a distinct gesture is distinct from every other code representing other respective gestures.

Alternately, instead of organizing the rows and columns of the table with different gesture characteristics, the local controller 60 in other aspects can determine only one characteristic at a time relating to the multi-point gesture. For example, the local controller 60 can determine a speed characteristic relating to the multi-point gesture, and if the speed corresponds to a predetermined classification code for the speed characteristic, the local controller 60 communicates that code to the controller 34. In addition, the local controller 60 determines a direction characteristic relating to the multi-point gesture, and if the direction corresponds to a predetermined classification code for the direction characteristic, the local controller 60 communicates that code to the controller 34. In other words, there may be two separate tables of classification codes, one for speed and the other for direction, and these individual codes are communicated by the local controller 60 to the controller 34. While this is more cumbersome and less desirable, it is contemplated as an alternative way of detecting gestures while still achieving an objective of transferring the burden of detecting gestures away from the controller 34 to the local controller 60.

The controller 34 can access the memory 37 for determining the characteristics corresponding to any particular predetermined gesture classification codes and their respective inputs to a wagering game. Or, the system memory 36 includes a similar table containing the predetermined gesture classification codes. In the exemplary table described above, the predetermined classification system includes five levels of a speed characteristic relating to the multi-point gesture and five levels of a spin direction characteristic relating to the multi-point gesture, for a total of 25 different gesture-related codes corresponding to a dice throw. It is contemplated more or fewer levels of speed or spin or other characteristics can be incorporated into the classification system.

To generate the predetermined classification codes, algorithms for interpreting the raw gesture data from the multi-touch sensing device 64 are developed iteratively. Various gestures are made relative to the multi-touch sensing device 64 to develop a range of speeds to correspond to a particular classification code. The algorithms can also be changed depending the gesture being simulated.

Thus, instead of having an infinite number of possible gestures that may occur, only a finite number of valid gestures are available. This simplifies and reduces the information that is supplied to the controller 34, yet creates in the player the perception that there are an infinite number of possible gestures. Thus, according to a method, the player simulates a gesture relating to a wagering game, i.e., a dice throw, by contacting the multi-point sensing device 64 at least two contact points simultaneously (e.g., points 67, 68). The array of input sensors 66 detects the contact points and the local processor 60 analyzes data outputted by the sensors 66 via the interface 62 to determine the relevant characteristics of the contacts (which together form the multi-point gesture), such as the location of a contact point, gesture duration/length, gesture spin direction, or gesture speed. Based on this information, the local controller 60 determines whether to assign a classification code to the sensed gesture, and, if so, communicates the classification code corresponding to the sensed gesture to the controller 34. The controller 34 receives the classification code and accesses a table of functions to execute depending upon the classification code. In an aspect, the system memory 36 or other suitable memory includes a plurality of predefined functions, each associated with different graphical animations of an object relating to the wagering game. Each animation depicts the object appearing to move in a manner that corresponds to the associated characteristics corresponding to the classification code.

For example, for a dice throw gesture, if the classification code indicates a slow speed and a straight spin direction, a first animation of the dice 82 (shown in FIG. 3) includes a sequence of images that when animated cause the dice 82 to appear to move at a relatively slow speed in a straight direction (code 2C in the exemplary table) on the primary display 14, 114 or on the secondary display 16, 116. Similarly, if another classification code indicates a fast speed and a hard right spin direction (code 4E in the exemplary table), a second animation of the dice 82 includes a sequence of images that when animated cause the dice 82 to appear to move at a relatively fast speed and spin in a hard-right direction. Alternately, instead of having predetermined sequences of animation data for each corresponding gesture classification code, a physics engine is employed for animating the dice 82 in real time in accordance with the characteristics parameters (in this example, speed and direction) passed to the physics engine.

The dice 82 are made to appear to move in accordance with the gesture characteristics indicated by the corresponding gesture classification code. In preferred aspects, the randomly selected outcome of the wagering game is predetermined, so the gesture does not have an effect on the outcome of the wagering game. However, the player may perceive the gesture as having some influence on the outcome, and thus the gesture may have the effect of imparting a sense of skill or control over the wagering game. To cement this impression, the speed and direction of the virtual dice 82 corresponds to the speed and direction of the gesture by the player. In this way, the player can make the dice 82 roll faster by making a faster gesture.

The object depicted on the display 14, 114, 16, 116 in response to the communication of a classification code from the local controller 60 to the CPU is related to the wagering game. In other aspects, the object (such as the dice 82) is involved in the depiction of a randomly selected outcome of the wagering game. For example, the values on the faces of the dice 82 can indicate or reflect a randomly selected outcome.

An advantage of the classification system described above includes the handling of "outlier" contact points. For example, certain types of gestures, such as a downward gesture, a gesture that skips across the surface of the multi-touch sensing device 64, etc., may cause a calculated algorithm to produce data that would generate gestures in odd directions, such as gestures with high velocities or zero velocity. The classification system described herein would only allow valid gesture-related outputs to be provided to the controller 34. In some examples, a "bad" input may be classified as a benign gesture or may be rejected completely. Under these conditions, the local controller 60 may assign a classification code that relates to a maximum, a minimum, or another predefined code to avoid communicating information based on a "bad" or invalid gesture.

Figure 4:
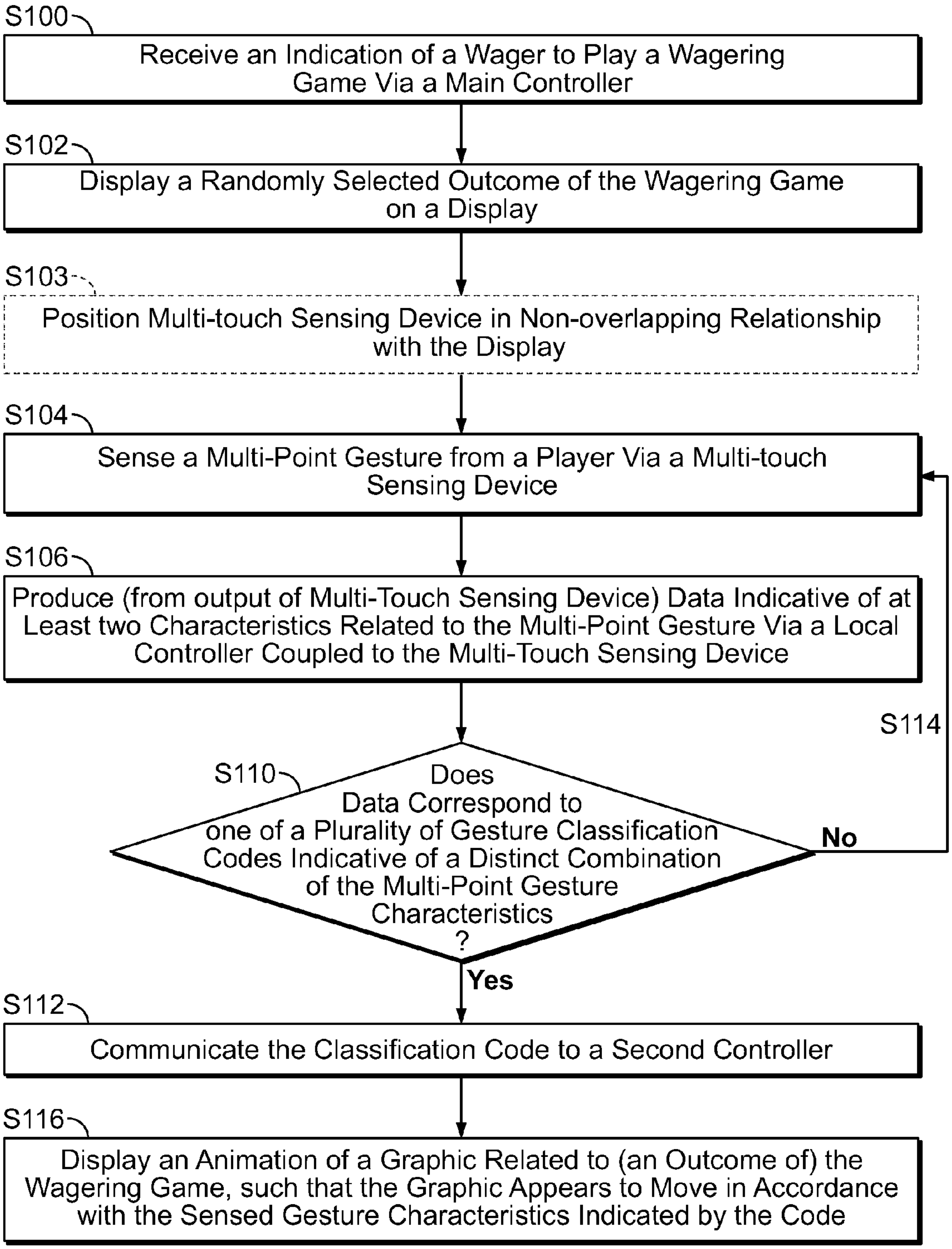
FIG. 4 is a flow diagram for an algorithm that corresponds to instructions executed by a controller in accord with at least some aspects of the disclosed examples.

An exemplary method of conducting a wagering game on a gaming machine associated with a multi-touch sensing device 64 is shown in FIG. 4. Upon receiving an indication of a wager to play a wagering game via the controller 34 (S100), a randomly selected outcome of the wagering game is displayed on the display 14, 114 or on the display 16, 116 (S102). In some embodiments, the multi-touch sensing device 64 is optionally positioned in a non-overlapping relationship with the display 14, 114 (S103). Upon sensing a multi-point gesture from a player via the multi-touch sensing device 64 (S104), data indicative of at least two characteristics (e.g., speed and spin direction) related to the multi-point gesture is produced via the local controller 60 that is coupled to the multi-touch sensing device 64 (S106). The multi-touch sensing device 64 may comprise an array of input sensors 66*a-p*, each input sensor 66*a-p* detecting at least one touch input made by the player. The characteristics may include the location, the direction and the speed of at least two distinct contact points. The local controller 60 determines whether the data corresponds to any one of a plurality of gesture classification codes, each code being indicative of a distinct combination of characteristics relating to the multi-point gesture (S110). If the data does not correspond to any of the plurality of gesture classification codes, the gaming machine 10 returns to sensing (at S104) a multi-point gesture via the multi-touch sensing device 64 (S114). If the data does correspond to one of the plurality of gesture classification codes, the corresponding classification code is communicated from the local controller 60 to the controller 34 (S112). An animation of a graphic 82 relating to the wagering game or related to an outcome of the wagering game is displayed (S116). The graphic 82 appears to move in accordance with the sensed gesture characteristic indicated by the code.

Thus, FIG. 4, described by way of example above, represents an exemplary algorithm that corresponds to the at least some of the machine instructions executed by the controller 34 and/or by the external systems 50 in FIG. 2 to perform the above described functions or acts associated with the disclosed aspects.

Figure 5:
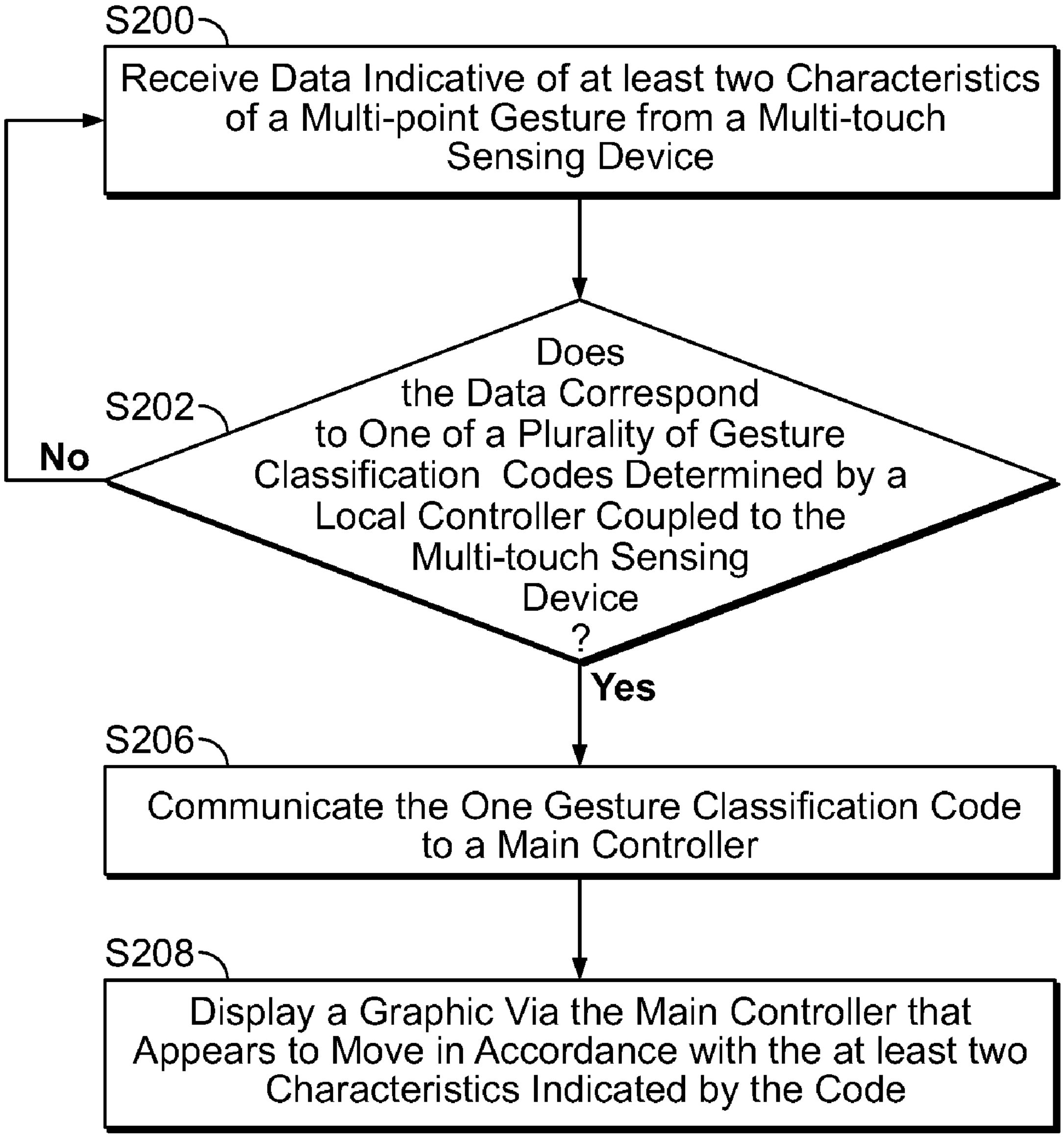
FIG. 5 is flow diagram for another algorithm that corresponds to instructions executed by a controller in accord with at least some aspects of the disclosed examples.

An exemplary method of detecting gestures sensed by a multi-touch sensing device 64 in a gaming machine 10, 110 is shown in FIG. 5. Upon receiving data indicative of at least two characteristics of a multi-point gesture from the multi-point sensing device 64 (S200), the local controller 60, coupled to the multi-touch sensing device 64, determines whether the data corresponds to one of a plurality of gesture classification codes (S202). The at least two characteristics include any combination comprising at least two of a location of a contact point relative to the multi-touch sensing device 64, a gesture direction, or a gesture speed. If the data does not correspond to any of the plurality of gesture classification codes, the gaming machine 10, 110 returns to receiving data indicative of at least two characteristics of a multi-point gesture (S200). If the data does correspond to one of the plurality of gesture classification codes, the one gesture classification code is communicated by the local controller 60 to the controller 34. Upon communicating the one gesture classification code to the controller 34 (S206), a graphic is displayed that appears to move in accordance with the at least two characteristics indicated by the code (S208)

Thus, FIG. 5, described by way of example above, represents another exemplary algorithm that corresponds to the at least some instructions executed by the controller 34 and/or external systems 50 in FIG. 2 to perform the above described functions associated with the disclosed aspects.

The multi-point input system 80 described herein provides a realistic, variable user experience with the appropriate level of processing power. This system allows the design to trade off complexity for perceived realism, and to find the best configuration of the classification codes during the development process. Also, the multi-point input system 80 allows the player to keep his or her visual focus on the main display of the gaming machine. And whereas a multi-touch LCD display is available in only a limited range of sizes and shapes (generally rectangular), the multi-touch sensing device 64 may be made in a variety of convention or unconventional sizes and shapes.

Although some examples described above have referred to dice throw gestures, in other aspects, other types of gestures are contemplated. For example, a "stir/mix" gesture is contemplated for stirring and/or mixing objects. The player uses one or more fingers to show how fast, in what direction, etc. an object is being spun and/or mixed. Additionally, a "card reveal" gesture is made by using two fingers, such as an index finger and a thumb finger, for example, to indicate a player picking up cards from a surface. Other possible gestures may include "ball toss," "dart throw," and the like. The "ball toss" and "dart throw" gestures approximates ball tossing and dart throw motions using the player's fingers. The player can control the spin direction of the ball or dart in a similar manner as with the dice throw by lifting one finger before the other finger. The player can also control the speed with which the ball or dart is thrown by controlling the speed with which the fingers are moved across the sensing device 64.

Any of these algorithms or methods disclosed herein include machine readable instructions for execution by: (a) a processor, (b) a controller, such as the controller 34 or the local controller 60, and/or (c) any other suitable processing device. Any algorithm or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Each of these embodiments or implementations and obvious variations thereof is contemplated as falling within the spirit and scope of the claimed invention, which is set forth in the following claims.

What is claimed is:

1. A gaming system, comprising:

a gaming terminal including an input device and a primary display, the input device configured to receive an indication of a wager to play a wagering game, the primary display being configured to display a randomly selected outcome of the wagering game;

a multi-touch input system that includes a multi-touch sensing device, a memory, and a local controller coupled to the multi-touch sensing device and to the memory, the multi-touch sensing device including an array of input sensors that detect a multi-point gesture, each sensor detecting at least one touch input made by a player of the wagering game, the memory including a plurality of gesture classification codes each representing a distinct combination of characteristics relating to the gesture, and wherein the local controller is programmed to receive data indicative of at least two of the characteristics related to the multi-point gesture and to determine whether the data corresponds to any one of the gesture classification codes; and a main controller coupled to the local controller to receive the one gesture classification code responsive to the local controller determining that the data corresponds to the one gesture classification code;

wherein the multi-touch sensing device is located in a non-overlapping relationship with the primary display, and wherein responsive to the multi-point gesture not corresponding to any of the gesture classification codes, the local controller does not transmit any of the gesture classification codes to the main controller.

2. The gaming system of claim 1, wherein the at least two characteristics include any combination comprising at least two of a location of a contact point relative to the multi-point sensing device, a gesture direction, or a gesture speed.

3. The gaming system of claim 1, wherein the main controller is programmed to cause a graphic relating to the wagering game to be displayed on the primary display such that the graphic appears to move in a manner corresponding to the at least two characteristics.

4. The gaming system of claim 3, wherein the graphic is involved in the depiction of the randomly selected outcome of the wagering game.

5. The gaming system of claim 1, wherein the multi-point gesture approximates a dice throw gesture such that a speed of the multi-point gesture is related to a speed of dice being thrown and a direction of the multi-point gesture is related to a spin direction of the dice, wherein the at least two of the characteristics correspond to the speed and to the direction.

6. The gaming system of claim 1, wherein the array of input sensors include an array of conductive pads arranged on a printed circuit board and the multi-touch input system further includes a substrate overlaying the array of input sensors, wherein the at least one touch input is made relative to the substrate.

7. The gaming system of claim 1, wherein the array of input sensors forms a grid of touchpad cells, each of the touchpad cells being capable of detecting at least one contact point.

8. The gaming system of claim 1, wherein the array of input sensors includes an array of conductive pads arranged on a printed circuit board and the multi-touch input system further includes a substrate overlaying the array of input sensors, wherein the at least one touch input is made relative to the substrate.

9. The gaming system of claim 1, wherein the at least two characteristics include any combination comprising at least two of a gesture direction, a gesture speed, or a spin direction, wherein the main controller is programmed to cause a graphic relating to the wagering game to be displayed on the primary display such that the graphic appears to move in a manner corresponding to the at least two characteristics, wherein the graphic is involved in the depiction of the randomly selected outcome of the wagering game.

10. The gaming system of claim 1, wherein the at least two characteristics include any combination comprising at least two of a gesture direction, a gesture speed, or a spin direction, wherein the main controller is programmed to cause a graphic relating to the wagering game to be displayed on the primary display such that the graphic appears to move in a manner corresponding to the at least two characteristics, wherein the graphic is involved in the depiction of the randomly selected outcome of the wagering game.

11. A method of conducting a wagering game on a gaming machine, the method comprising:

displaying a wagering game on a display of the gaming machine;

accepting a player input at a player input device of the gaming machine and transforming the player input to an indication of a wager to play the wagering game; receiving, via a main controller, the indication of the wager;

sensing a multi-point gesture from a player via a multi-touch sensing device, the multi-touch sensing device comprising an array of input sensors, each sensor detecting at least one touch input made by the player, the multi-point sensing device being located on the gaming machine in a non-overlapping relationship with the display;

producing, from an output of the multi-touch sensing device, data indicative of at least two characteristics related to the multi-point gesture via a local controller coupled to the multi-touch sensing device;

determining whether the data corresponds to one of a plurality of gesture classification codes, each a distinct combination of characteristics relating to the multi-point gesture; and responsive to the data corresponding to the one gesture classification code, communicating the one gesture classification code to the main controller;

responsive to the data not corresponding to any of the gesture classification codes, not communicating any of the gesture classification codes to the main controller; and using the main controller to cause the display to display an outcome of the wagering game.

12. The method of claim 11, further comprising displaying an animation of a graphic related to an outcome of the wagering game, wherein the graphic appears to move in accordance with the sensed gesture characteristics indicated by the code.

13. The method of claim 12, wherein the characteristics of the multi-point gesture include a location, a direction and a speed of the at least two distinct contact points.

14. The method of claim 13, wherein the multi-point gesture approximates a dice throw gesture, and wherein the animated graphic that is displayed depicts at least two dice being thrown such that the speed of the multi-point gesture is related to a speed of the dice being thrown and the direction of the multi-point gesture is related to a spin direction of the dice.

15. A computer readable storage medium encoded with instructions for directing a gaming system to perform the method of claim 11.

16. A method of detecting gestures sensed by a multi-touch sensing device in a gaming machine, the method comprising:

causing a wagering game to be displayed on a display of the gaming machine;

accepting a player input at a player input device of the gaming machine and transforming the player input to an indication of a wager to play a wagering game on the gaming machine;

receiving, from an array of input sensors of the multi-point sensing device, data indicative of at least two characteristics related to a multi-point gesture sensed by the array of input sensors, the multi-point gesture being made by a player of the wagering game relative to the array of input sensors, the multi-point sensing device being located on the gaming machine in a non-overlapping relationship with the display;

determining, via a local controller coupled to the multi-point sensing device, whether the data corresponds to any one of a plurality of gesture classification codes, each code representing a distinct combination of characteristics relating to the multi-point gesture;

responsive to the data corresponding to one of the gesture classification codes, communicating the one gesture classification code to a main controller, which causes a graphic to be displayed via the main controller on a display of the gaming machine, the graphic appearing to move in accordance with the at least two characteristics indicated by the code, the graphic being related to the wagering game;

responsive to the data not corresponding to any of the gesture classification codes, ignoring the data such that the main controller does not receive any of the gesture classification codes; and using the main controller to cause the display to display an outcome of the wagering game.

17. The method of claim 16, wherein the at least two characteristics include any combination comprising at least two of a location of a contact point relative to the multi-point sensing device, a gesture direction, or a gesture speed.

18. The method of claim 17, wherein the at least two characteristics include the gesture direction and the gesture speed, wherein the graphic includes simulated dice, and wherein the multipoint gesture approximates a dice throw gesture such that the gesture speed of the multi-point gesture is related to a speed of the simulated dice and the gesture direction of the multi-point gesture is related to a spin direction of the simulated dice.

19. The method of claim 18, wherein the simulated dice are involved in the depiction of a randomly selected outcome of the wagering game.

* * * * *